March 7, 1967 — W. G. STOPPE — 3,307,807
VARIABLE LIFT WING
Original Filed July 17, 1963
4 Sheets-Sheet 1
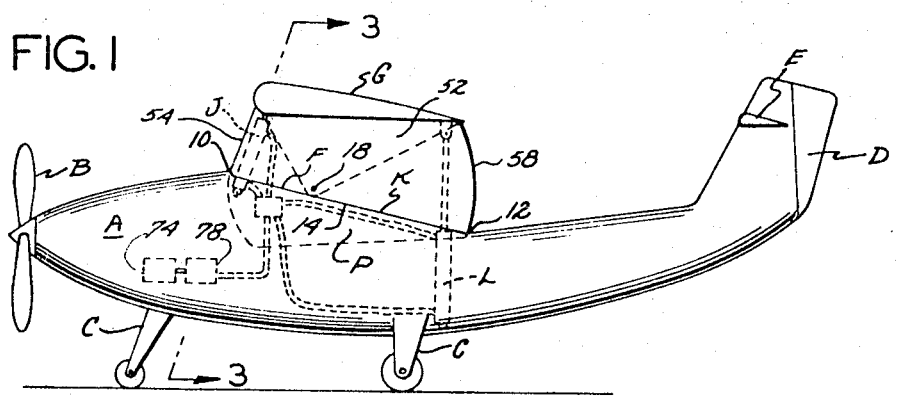
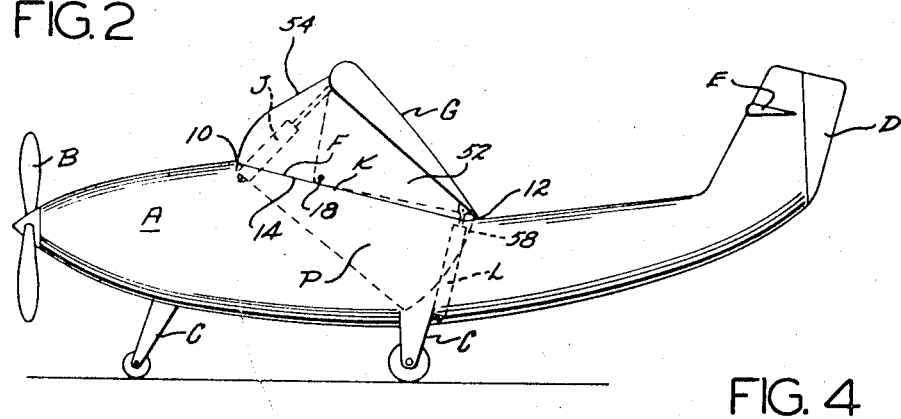
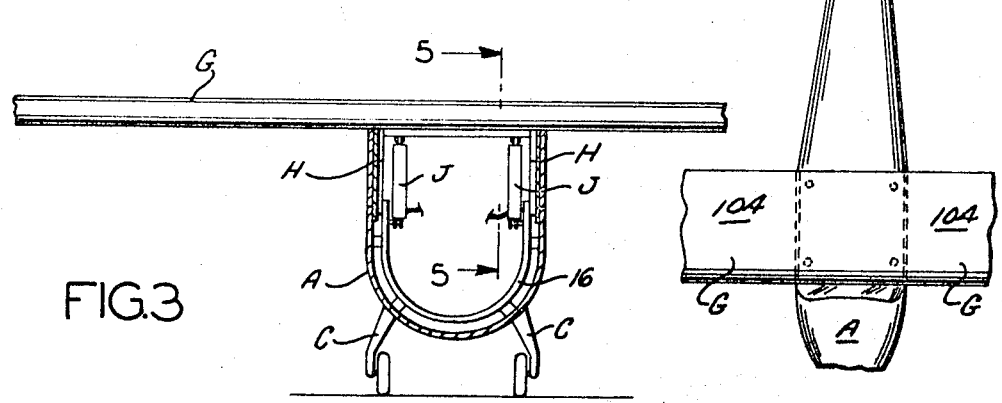
INVENTOR
WILLY G. STOPPE
BY William C. Babcock
ATTORNEY

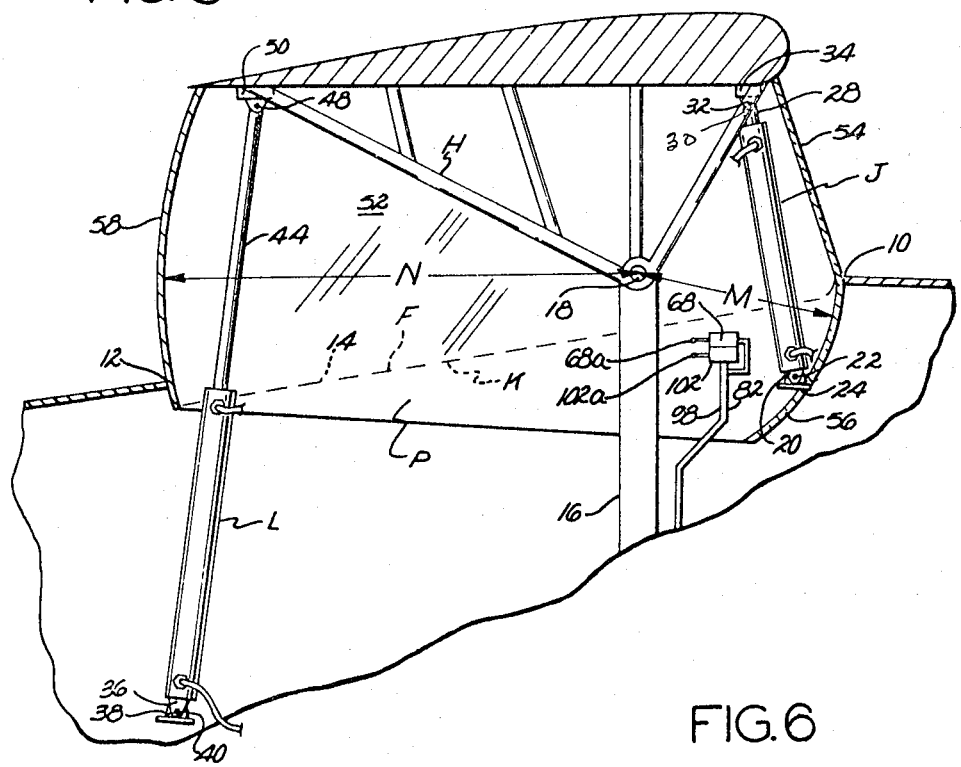
FIG. 5
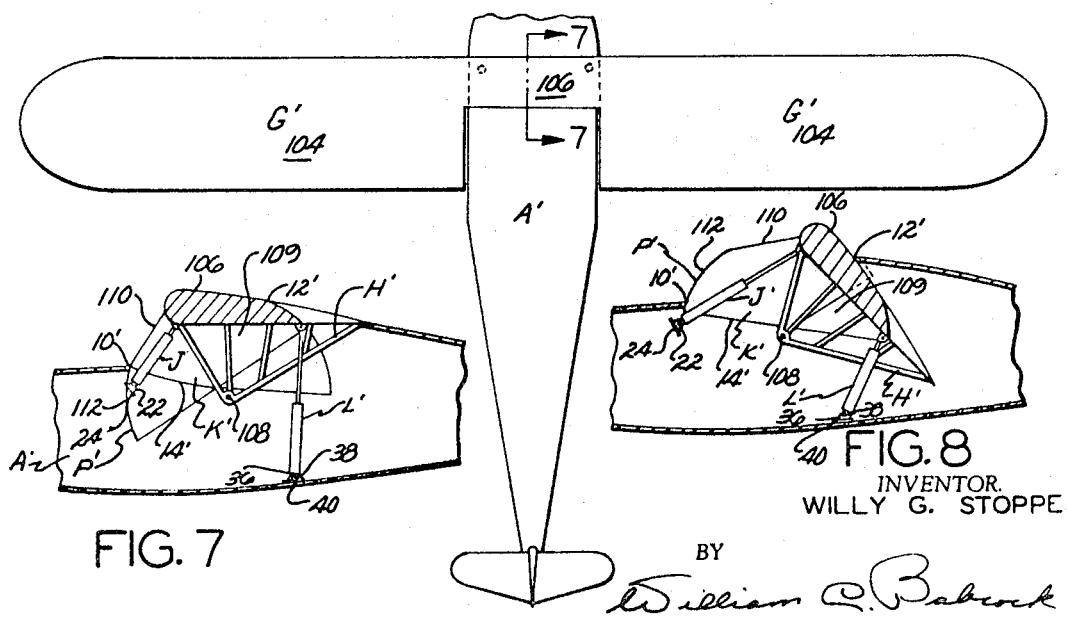
FIG. 6
FIG. 7
FIG. 8
INVENTOR.
WILLY G. STOPPE
BY William C. Babcock
ATTORNEY March 7, 1967 W. G. STOPPE 3,307,807
VARIABLE LIFT WING
Original Filed July 17, 1963 4 Sheets-Sheet 3

INVENTOR.
WILLY G. STOPPE
BY
ATTORNEY

March 7, 1967 W. G. STOPPE 3,307,807
VARIABLE LIFT WING
Original Filed July 17, 1963 4 Sheets-Sheet 4

INVENTOR.
WILLY G. STOPPE
BY
William C. Babcock
ATTORNEY

United States Patent Office 3,307,807
Patented Mar. 7, 1967

3,307,807
VARIABLE LIFT WING
Willy G. Stoppe, Long Beach, Calif., assignor of one-half to Nancy Vos, Long Beach, Calif.
Original application July 17, 1963, Ser. No. 295,754, now Patent No. 3,190,583, dated June 22, 1965. Divided and this application Dec. 11, 1964, Ser. No. 417,553
12 Claims. (Cl. 244—48)

The present application is a division of my application entitled, Variable Lift Wing, filed in the United States Patent Office July 17, 1963, under Serial No. 295,754, now Patent No. 3,190,583.

The present invention relates generally to the field of aircraft, and more particularly to an airplane including one or more tiltable airfoil surfaces to selectively vary the lift, glide and landing characteristics of the plane.

A major object of the present invention is to provide an airplane having one or more adjustable airfoil surfaces which may be so disposed as to shorten the distance required for take-off as well as landing of the plane, yet when in flight may be positioned to increase or decrease the lift of the airfoil surfaces, and by sequential tilting thereof may be utilized to materially reduce the speed of the airplane in steps, prior to the landing thereof.

Another object of the invention is to provide a tiltable airfoil surface that may be used equally well on high, middle or low wing aircraft designs, is of relatively simple mechanical structure, and requires a minimum of maintenance attention.

Yet another object of the invention is to provide an adjustable airfoil surface for use with jet powered aircraft, as well as movable flaps which can be selectively positioned in the discharge of the jet engine to guide the plane and at the same time increase the lift thereof, with the airfoil surface, in the event of power failure, being adjustable to act as a semi-parachute in the landing of the plane at a slow and relatively safe speed even on rough terrain.

A still further object of the invention is to provide a jet-powered aircraft having a pivotally supported variable lift wing which is also adapted to serve as a mounting for the jet engine, in addition to powering the aircraft, and serving the guide the same when the direction of the exhaust stream therefrom is varied.

These and other objects and advantages of the invention will become apparent from the following description of a second alternate form thereof, and from the accompanying drawings illustrating the same, in which:

FIGURE 1 is a side elevational view of an airplane incorporating the tiltable airfoil structure which is disposed in a substantially horizontal position;

FIGURE 2 is a side elevational view of the plane shown in FIGURE 1, but with the airfoil in a tilted position;

FIGURE 3 is a vertical cross-sectional view of the airplane shown in FIGURE 1, taken on line 3—3 thereof;

FIGURE 4 is a fragmentary top plan view of the center of the plane shown in FIGURE 1;

FIGURE 5 is a fragmentary vertical cross-sectional view of the plane, taken on line 5—5 of FIGURE 3, showing in detail the apparatus used in adjusting the airfoil;

FIGURE 6 is a fragmentary top plan view of a first alternate form of airplane structure showing a tiltable airfoil used therewith;

FIGURE 7 is a fragmentary side elevational view of the plane shown in FIGURE 6 showing the airfoil in a first position relative to the fuselage thereof;

FIGURE 8 is a second fragmentary side elevational view of the plane illustrated in FIGURE 6 showing the tiltable airfoil in a second position;

Figure 14:
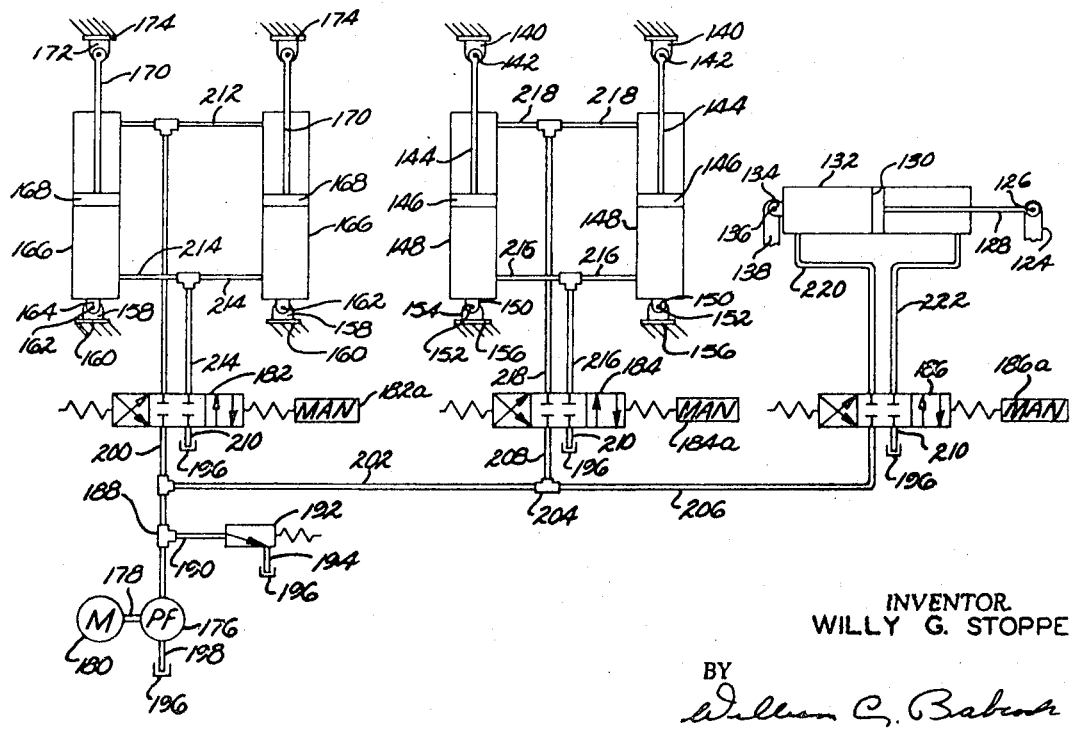
FIGURE 14 is a diagrammatic view of the hydraulic system in detail used in the plane shown in FIGURES 9–12 inclusive.

With continuing reference to the drawings, a second alternate form of the invention is shown in FIGURES 9–12 inclusive, and the hydraulic system used therewith is illustrated in FIGURE 14. This form of the aircraft includes an elongate fuselage R of conventional construction having a forwardly disposed transparent canopy S enclosing the pilot's cockpit T. A swept-back wing U is provided, preferably of delta configuration, which not only presents the airfoil surface, but serves as a mounting for a jet engine V. Two laterally spaced vertical stabilizers W are mounted on the upper surface of wing U. A number of lugs 116 depend from the under surface of wing U that pivotally engage transverse pins 118 which are supported from the fuselage R by conventional means.

That portion of the fuselage R forwardly of the canopy S rotatably supports a transverse shaft 120, and the projecting portions of this shaft are enveloped by horizontal stabilizers 122. That portion of the shaft 120 within the fuselage R has a lever 124 projecting upwardly therefrom that is pivotally connected by a pin 126 to the forward end of a piston rod 128. As may best be seen in FIGURE 14, piston rod 128 is connected to a piston 130 that is slidably mounted in a hydraulic cylinder 132. A lug 134 projects from the rear end of cylinder 132 that pivotally engages a pin 136 which is supported on the upper end of an upright 138, the lower end of which is connected to the fuselage R by conventional means (not shown).

The wing U also includes a pair of laterally spaced lugs 140 which are connected by pins 142 to the upper ends of piston 144. The piston rods 144 are in turn connected to pistons 146 that are slidably movable in hydraulic cylinders 148. Lugs 150 project from the lower ends of cylinders 148 and are pivotally engaged by pins 152, which in turn are supported by brackets 154 from lower interior portions 156 of the fuselage R, as shown in FIGURES 10 and 14.

Two laterally spaced brackets 158 are provided that are affixed by conventional means to lower interior portions 160 of the fuselage R, with the brackets supporting pins 162 therefrom. The pins 162 pivotally engage lugs 164 that are mounted on the lower ends of hydraulic cylinders 166. Pistons 168 are slidably mounted in cylinders 166, and these pistons are connected to upwardly extending piston rods 170, which are pivotally connected on their upper ends to lugs 172 affixed to portions 174 of the wing U.

Figure 10:
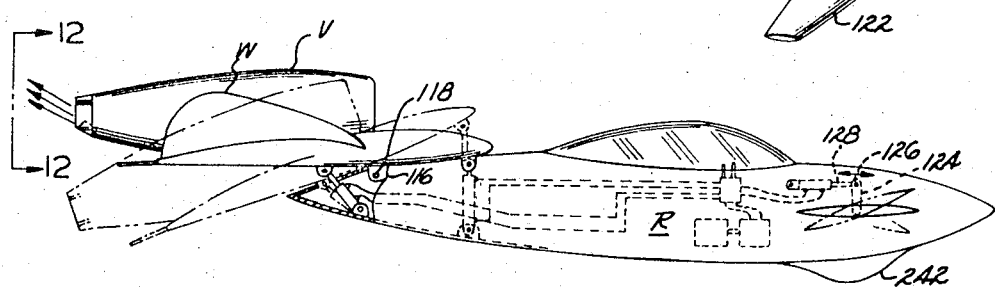
FIGURE 10 is a side elevational view of the plane shown in FIGURE 9, portions of which have been broken away to partially illustrate the hydraulic system used in tilting the airfoil surfaces.
Figure 11:
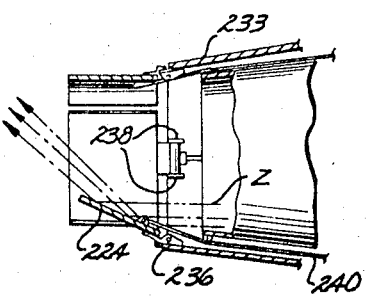
FIGURE 11 is a fragmentary vertical cross section of the rear of the jet engine showing the manner in which a number of hinged flaps may be selectively moved into the jet discharge stream to guide the plane.
Figure 12:
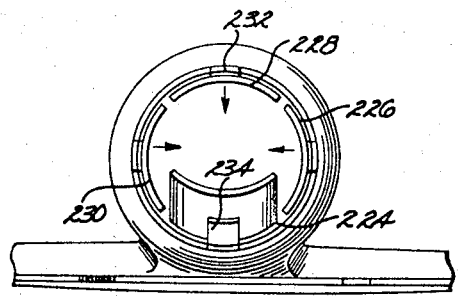
FIGURE 12 is a fragmentary rear elevational view of the plane shown in FIGURE 10 taken on line 12—12.
Figure 13:
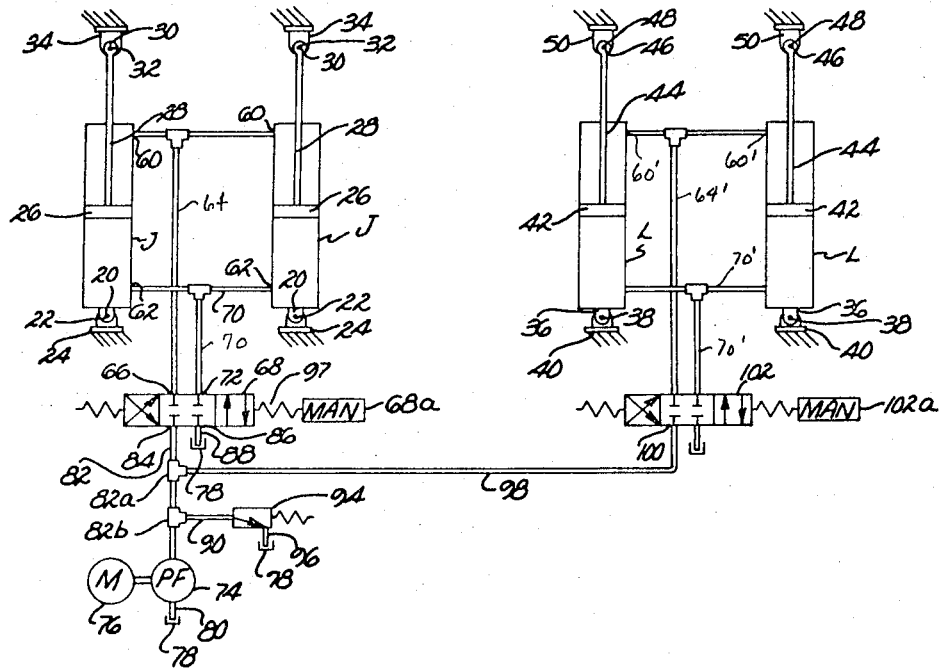
FIGURE 13 is a diagrammatic view of the hydraulic system shown in FIGURE 1.

When the pistons 146 and 168 are moved in the cylinders 148 and 166 respectively, the piston rods 144 and 170 are moved to pivot the wing G between the first position shown in solid line in FIGURE 10 and a second position shown in phantom line in the same figure. The adjustable tilting of the wing G may be utilized to reduce the distance required for take-off or in landing, reduce the landing speed, and by intermittent adjustment of wing position while the aircraft is in flight, but with the engine (not shown) thereof dead, glide the aircraft in a manner to reduced the speed in steps, whereby the final speed is sufficiently slow as to permit an emergency landing on relatively rough terrain. The tilting of the wing U between the two positions mentioned above is effected by the discharge of hydraulic fluid under pressure to the pistons 144 and 166.

Hydraulic fluid under pressure is supplied by a fixed displacement pump 176 that is driven by a shaft 178 connected to a motor or other prime mover 180. Three directional three-position, four-connection closed center valves 182, 184 and 186 are provided. A T 188 is connected to the discharge of pump 176 and also to a line 190 that in turn is connected to a maximum pressure valve 192. Valve 192 is connected by a line 194 to a hydraulic fluid reservoir 196. The suction of pump 176 is connected by a line 198 to reservoir 196. The T 188 is connected to a line 200 that extends to one connection on valve 182, and the line 200 has a lateral 202 extending therefrom to a T 204. T 204 is connected to a line 206 that extends to one connection on the valve 186, and to a line 208 extending to a connection on the valve 184.

Each valve 182, 184 and 186 has one connection thereon joined by a line 210 to a reservoir 196. Openings are formed in the upper portions of cylinders 166 that are connected to a line 212 that extends to one connection on valve 182. Cylinders 166 also have connections in the lower end portions thereof that are connected to line 214 which extend to one connection on the valve 182.

The upper ends of cylinders 148 have connections in the upper portions thereof that are joined to lines 216 which extend to one connection on valve 184. Connections on the lower end portions of the cylinders 178 are joined to lines 218 which extend to one connection on the valve 184.

The valves 182, 184 and 186 are controlled by spring-loaded handles 182a, 184a and 186a. The cylinder 132 has two connections on the end portions thereof, one of which is connected by a line 220 to one connection on the valve 186, with the other connection on the cylinder 132 having a line 222 extending therefrom to a connection on the valve 186. Due to the spring-loading thereof, the handles 182a, 184a and 186a normally maintain their associated valves in positions where fluid on both sides of the pistons 168, 146 and 130 is locked in the cylinders in which the pistons are mounted until the valves 182, 184 and 186 are manually moved to positions to permit discharge of fluid into one end of the cylinders with the concurrent discharge of fluid from the other end of the cylinder to permit the wing U to be tilted between the first and second positions previously mentioned, as well as to permit movement of the stabilizer 122.

When the handle 182 is moved to the left as illustrated in FIGURE 14, the flow of fluid to and from cylinders 166 is such that the piston 168 is moved downwardly therein, and pivots the wing U from the position shown in solid line in FIGURE 10 towards that shown in phantom line in the same figure. Movement of the handle 182 to the right reverses the flow of fluid to the cylinders 166, and the wing U is moved towards the position shown in FIGURE 10.

Movement of handle 184 to the left (FIGURE 14) results in flow of fluid to and from the cylinders 148 to move the piston rods 144 upwardly to move the wing U towards the position shown in phantom line in FIGURE 10. When handle 184 is moved to the right, the flow of fluid to and from the cylinders 148 is reversed to move the pistons 146 downwardly and pivot the wing U towards the position shown in solid line in FIGURE 10. When handle 186a is moved to the left, discharge of hydraulic fluid to and from the cylinder 182 occurs in a direction in which the stabilizer 122 is moved toward the position shown in phantom line in FIGURE 10. Movement of the handle 186a (FIGURE 14) to the right reverses the flow of fluid to and from the cylinder 132 in a direction to pivot the stabilizer 122 towards the position shown in solid line in FIGURE 10.

Guidance of the aircraft is conveniently carried out by means of four arcuate deflectors 224, 226, 228 and 230 that are each supported by hinges 232 from the rear portion 233 of the jet engine V. Each hinge 232 includes a central portion 234 that is pivotally mounted on a transverse pin 236, which pin is supported between two taps 238 that are affixed to the interior rear surface 233 of the jet engine V. By spring means or other conventional means, the deflectors 224, 226, 228 and 230 are held in rearwardly extending positions relative to the jet engine V and substantially parallel to the discharge therefrom.

Four cables 240 are provided that extend forwardly to the cockpit T, with each cable being connected to the deflectors 224, 226, 228 and 230 by tensioning any one of the cables by conventional means (not shown) located in the cockpit T. A deflector can be pivoted inwardly, as illustrated by the deflector 224 in FIGURE 11, and the deflector then directs a portion of the jet discharge stream Z upwardly at an angle relative to its direction of flow from the engine V, and this change of direction in the stream Z is reflected by exertion of a downward force on the deflector 224 for guidance purposes.

By manipulating the deflectors 224, 226, 228 and 230 the jet discharge stream Z can be deflected to impart desired horizontal or vertical forces, or a combination thereof to the rear portion of the second alternate form of the plane to guide the plane. The second alternate form of the invention (FIGURE 10) is also provided with a rudder 242 that is pivotally supported from the plane in the forward position shown in FIGURE 10. By manual, hydraulic, electrical, or other conventional means the rudder 242 can be pivoted relative to the fuselage R to assist in guiding the plane.

Figure 9:
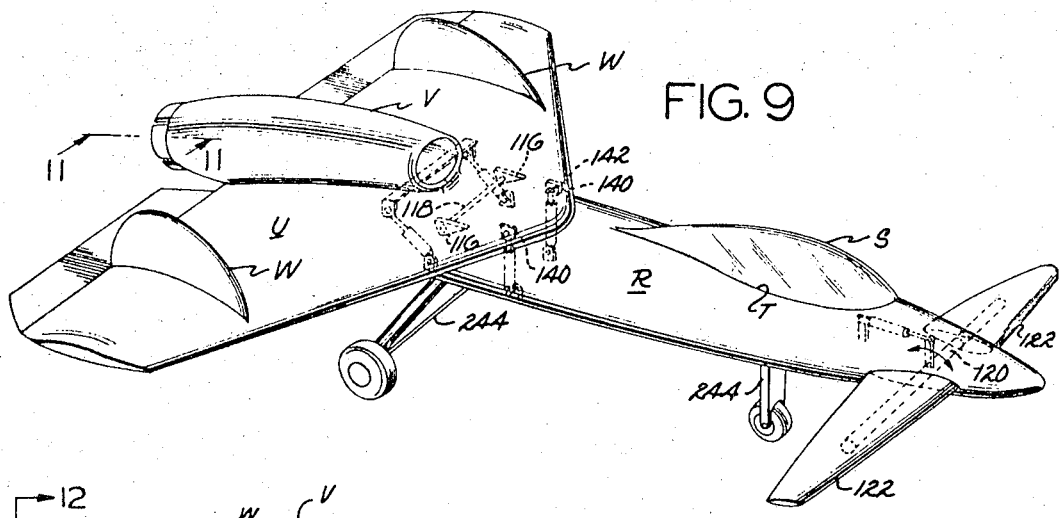
FIG. 9 is a perspective view of a jet powered aircraft showing forwardly and rearwardly disposed tiltable airfoil surfaces, together with selectively positionable flaps that may be moved into the jet discharge stream to guide the plane.

A landing gear 244 of conventional structure is supported from the second alternate form of the aircraft, as shown in FIGURE 9, and this landing gear by manual or power means is retractable into the fuselage R after the plane is in flight.

In the operation of the second alternate form of aircraft described herein, as well as the two forms thereof described in my co-pending application, Serial No. 295,754, the fuselage of each form remains in a horizontal position during flight, and the speed in flight, as well as in landing, is controllable by the tilting of the wings thereof.

The speed of the three forms of the aircraft described herein and in said application Serial No. 295,754, can be substantially reduced prior to landing by controlled tilting of the wings. Also, in the second alternate form of the invention the stabilizers 122 are tilted as well as the wings U, both in landing as well as take-off of the aircraft. In the event of engine failure with any one of the three forms of the invention, the velocity of the plane as it glides towards the earth can be intermittently reduced by sequential pivoting of the wings to tilted position relative to the fuselage of the planes. Also, in the second alternate form of aircraft, the distance required for take-off can be minimized by tilting the deflector 224 towards the position shown in FIGURE 11. The discharge stream from the jet engine V exerts a downward force on deflector 224 and the rear portion of fuselage R. The fuselage R tends to pivot on the rear portion of the landing gear R, with the forward portion of the fuselage 224 tending to rise to an airborne position.

The wing U of the second alternate form shown in FIGURES 9 to 12, is of delta design and has an airfoil cross section. Wing U supports the jet engine V, with the direction of flight of the second alternate form of the plane being controllable not only by concurrent pivoting of the wing and engine relative to the fuselage R, but by pivotal movement of the deflectors 224, 226, 228 and 230. Vertical movement of the second alternate form of plane is also achieved by pivotal movement of stabilizer 122.

The pumps 74 and 176 may be driven by motors 76 and 180 respectively, by power take-off from the engines powering the free forms of planes, or by other desired power sources. Should it be desired, the wings G, G' and U may be mechanically locked in their normal horizontal positions by conventional latching devices (not shown).

From the previous description thereof, it will be apparent that the tiltable wing structure of the present invention can be applied to propeller-driven planes, high, mid or low wing planes, single or multi-engine planes, jet-propelled planes, as well as delta planform and other unconventional aircraft designs. In illustrating the controlled tilting of the wings, it has been found convenient to use hydraulic power as an example. However, electrical power, pneumatic, or electromechanical power can be utilized for this purpose if desired.

Actual flight tests have been made with models of the airplane shown in FIGURES 1–5, inclusive, which is described in structural detail in said application Serial No. 295,754. These models were one-sixth normal size of their counterpart, and were radio controlled. This size was selected as the NACA data indicated that tests made of a model of this size would provide valid test data for application to a full-sized aircraft.

The control system used on the test model is a completely proportional simultaneous system providing a complete duplication of the control functions in the full-sized aircraft, thus enabling the pilot to perform any function in the test aircraft that could be performed in the full-sized aircraft with a pilot at the controls, except that the rudder and aileron commands were electronically coupled so as to provide simultaneous coordinated control of these two functions.

The flight test data indicated the following facts:
(a) Lift off on take-off could be achieved at a much earlier time by rotating the airfoil to increase the angle of attack during take-off;
(b) Landing speed and roll could be greatly reduced; in fact, almost to zero by utilizing the full tilt feature;
(c) Transition in flight was accomplished smoothly and easily both from normal to full tilt condition and back to normal again.

Manipulation of the deflectors 224, 226, 228 and 230 may be by power means (not shown) that are actuated by radio or radar signals. Such steering of a jet propelled vehicle is particularly useful when applied to rockets and missiles. Fuel is supplied to the jet engine by conventional means (not shown) from tanks (not shown) that may be disposed in either the fuselage R or wing U.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:
1. In combination with an aircraft including a fuselage having an enclosed cockpit in the forward portion thereof and a landing gear:
(a) a wing disposed above said fuselage and extending transversely thereacross rearwardly of said cockpit;
(b) first means for pivotally connecting said wing to said fuselage;
(c) a jet engine rigidly mounted on the upper central surface of said wing and projecting rearwardly therefrom;
(d) power means for selectively pivoting said wing and engine between a first position and a second position, which wing when in said second position tilts downwardly and rearwardly at a greater angle than when in said first position; and
(e) second means for selectively varying the direction of the discharge stream from said engine to at least partially guide said aircraft as said wing is tilted between said first and second position.

2. An aircraft as defined in claim 1 wherein said wing is delta shaped.

3. An aircraft as defined in claim 1 wherein said wing is of swept-back design.

4. An aircraft as defined in claim 1 which further includes:
(f) two stabilizers pivotally supported from said fuselage on opposite sides of the forward portion thereof that are selectively movable by said power means between a first position and a second position, which stabilizers when in said second position tilt downwardly and rearwardly at a greater angle than when in said first position.

5. An aircraft as defined in claim 1 wherein said second means comprise:
(f) a plurality of deflectors circumferentially disposed about the discharge from said engine;
(g) means for pivotally supporting said deflectors from the rear portion of said engine; and
(h) means for selectively pivoting each of said deflectors in and out of the discharge stream from said engine for at least partially guiding said aircraft.

6. An aircraft as defined in claim 1 wherein a plurality of transversely spaced, longitudinally extending stabilizers project from said wing.

7. An aircraft as defined in claim 1 wherein the discharge portion of said jet engine is disposed rearwardly from the rearwardmost portion of said landing gear.

8. An aircraft as defined in claim 1 wherein said power means pivots said wing between said first and second positions by hydraulic fluid under pressure.

9. An aircraft as defined in claim 4 wherein said power means pivots said wing and said pivotally supported stabilizers by hydraulic fluid under pressure.

10. In combination with an aircraft that includes an elongate fuselage having a cockpit opening formed in the forward portion thereof:
(a) a transparent rigid shell extending over said opening to protect a pilot in said fuselage from an airstream when said aircraft is in motion;
(b) two stabilizers extending outwardly in opposite directions from the longitudinal sides of said fuselage forwardly of said opening;
(c) first means for pivotally supporting said stabilizers from said fuselage;
(d) a wing transversely positioned above said fuselage rearwardly from said cockpit opening;
(e) second means for pivotally supporting said wing from said fuselage;
(f) a jet engine;
(g) third means for rigidly supporting said jet engine in a rearwardly extending position from the upper central surface of said wing; and
(h) hydraulic means for selectively pivoting said stabilizer and wing between first and second positions to vary the flight characteristics of said aircraft.

11. An aircraft as defined in claim 10 which further includes:
(a) a plurality of circumferentially spaced deflectors;
(b) means for pivotally supporting said deflectors from the rear portion of said engine; and (c) means for selectively pivoting said deflectors into the discharge from said engine to deflect the same and guide said aircraft when in flight.

12. An aircraft as defined in claim 11 which further includes:
(a) a rudder pivotally supported below the forward portion of said fuselage to assist in guiding said aircraft when in flight.

References Cited by the Examiner

UNITED STATES PATENTS

| | | | |
|---|---|---|---|
| 2,260,952 | 10/1941 | Novack | 244—91 X |
| 2,765,993 | 10/1956 | Custer | 244—52 |
| 2,846,164 | 8/1958 | Haberkorn | 244—52 X |
| 2,928,238 | 3/1960 | Hawkins | 244—52 X |
| 2,953,322 | 9/1960 | Lewis | 244—48 X |
| 2,985,408 | 5/1961 | Johnson | 244—48 |
| 3,018,983 | 1/1962 | Davidson | 244—42 |
| 3,097,817 | 7/1963 | Towzey | 244—42 |
| 3,147,938 | 9/1964 | Danner | 244—48 |

MILTON BUCHLER, *Primary Examiner.*

FERGUR S. MIDDLETON, *Examiner.*

B. BELKIN, *Assistant Examiner.*